United States Patent [19]

Anger

[11] Patent Number: 4,521,178
[45] Date of Patent: Jun. 4, 1985

[54] APPARATUS FOR PRODUCING UNDERCUT TUBULAR SYNTHETIC PLASTIC ARTICLES

[75] Inventor: Anton Anger, Linz, Austria

[73] Assignee: Österreichische Schiffswerften Aktiengellschaft Linz-Korneuburg, Linz-Korneuburg, Austria

[21] Appl. No.: 286,314

[22] Filed: Jul. 24, 1981

Related U.S. Application Data

[63] Continuation of Ser. No. 157,684, Jun. 9, 1980, abandoned, which is a continuation of Ser. No. 956,782, Nov. 1, 1978, abandoned, which is a continuation-in-part of Ser. No. 707,628, Jul. 22, 1976, Pat. No. 4,127,632.

[30] Foreign Application Priority Data

Jul. 29, 1975 [AT] Austria .................................. 5878/75
Oct. 10, 1975 [AT] Austria .................................. 7770/75

[51] Int. Cl.$^3$ .................................................. B29C 7/00
[52] U.S. Cl. .................................... 425/548; 425/437; 425/438; 425/577; 425/DIG. 218
[58] Field of Search ............... 425/DIG. 19, DIG. 58, 425/DIG. 218, 436, 438, 444, 556, 577, 334, 437; 249/59, 63, 64, 67, 68

[56] References Cited

U.S. PATENT DOCUMENTS

| | | | |
|---|---|---|---|
| 3,020,594 | 2/1962 | Makowski | 425/DIG. 58 |
| 3,679,339 | 7/1972 | Tucker | 425/556 |
| 3,904,165 | 9/1975 | Boer | 425/438 X |
| 3,940,103 | 2/1976 | Hilaire | 425/438 X |
| 3,987,144 | 10/1976 | Nickold | 425/DIG. 58 |
| 4,100,307 | 7/1978 | Asano | 425/DIG. 218 |

Primary Examiner—Thomas P. Pavelko
Attorney, Agent, or Firm—Kontler, Grimes & Battersby

[57] ABSTRACT

Undercut tubular synthetic plastic articles, such as fittings, are formed in the mold cavity of an injection molding machine on a one- or two-piece core a portion of which is surrounded by the undercut portion of the article and a first smaller-diameter portion at one side of the undercut portion. If the core consists of two components, a cylindrical component of the core slidably guides the aforementioned portion and is surrounded by a second smaller-diameter portion of the article at the other side of the undercut portion. When the injection of plasticized material is completed, the housing of the mold is opened to expose the undercut portion and the first smaller-diameter portion of the article on the core, the first smaller-diameter portion and the undercut portion are heated to or maintained at a temperature at which they can undergo elastic deformation, and the aforementioned portion of the core is moved axially of the article and of the cylindrical component so that the first smaller-diameter portion of the article is expanded by an external ring-shaped projection which forms part of the core portion and was surrounded by the undercut portion. The first smaller-diameter portion of the article thereupon contracts so that its inner diameter is again less than the inner diameter of the undercut portion. The article is allowed to harden prior to complete separation from the core, and the first smaller-diameter portion is held against excessive contraction during hardening of the article.

11 Claims, 6 Drawing Figures

APPARATUS FOR PRODUCING UNDERCUT TUBULAR SYNTHETIC PLASTIC ARTICLES

CROSS-REFERENCE TO RELATED APPLICATION

This is a continuation of Ser. No. 157,684 filed June 9, 1980 and now abandoned, which is a continuation of Ser. No. 956,782 filed Nov. 1, 1978 and now abandoned, which is a continuation-in-part of Ser. No. 707,628 filed July 22, 1976, now U.S. Pat. No. 4,127,632 granted Nov. 28, 1978.

BACKGROUND OF THE INVENTION

The present invention relates to apparatus for the production of plastic articles which constitute tubes or include tubular portions, and more particularly to improvements in apparatus for the production of plastic articles which exhibit one or more undercuts in the form of internal grooves or recesses provided in a tubular portion which is flanked by tubular portions having smaller inner diameters. Such undercuts are often necessary in fittings in order to receive sealing elements in the form of gaskets or packings. Still more particularly, the invention relates to improvements in the molds of injection molding or analogous machines.

Flanged fittings or pipe connectors (e.g., elbows, return bends, tees, crosses, reducing couplings or straight unions) are often provided with undercuts to accommodate sealing elements for the ends of flexible or rigid pipes which are inserted into the fittings. In accordance with a presently prevailing technique, undercuts in the flanges of fittings which are produced in injection molding machines are formed by resorting to one or more secondary operations which contribute to the cost of such articles. For example, it is known to provide a flange of a fitting with a relatively thick circumferentially complete rib or bead which is thereupon treated from within (e.g., by resorting to milling or turning tools) in order to form therein a ring-shaped internal recess or groove for reception of a sealing element. The formation of such internal groove takes place subsequent to ejection of the article from an injection molding machine so that the interval which is required for completion of an undercut fitting is much longer than the interval which is required for completion of the injection molding cycle.

It was further proposed to make undercut fittings in specially designed injection molding machines wherein the injection molding cycle precedes a blowing cycle serving for the formation of an undercut in one or more flanges of the fitting. It is also known to produce fittings in conventional injection molding machines which furnish fittings with flanges having internal surfaces of constant diameter, and to thereupon introduce such fittings into a blow molding machine which expands a selected portion of a flange so as to provide the internal surface of the flange with a groove for reception of sealing means. Such procedures are not satisfactory because the wall thickness of a blow molded undercut portion invariably deviates from the wall thickness of neighboring portions of the finished article.

In accordance with still another presently known technique, that flange of a fitting which is to be provided with an undercut resembles an outwardly flaring hollow frustum of a cone, and the outermost portion of such flange is thereupon treated to reduce its dimensions, i.e., the inner diameter of the thus contracted portion is less than the inner diameter of the neighboring portion. The neighboring portion can receive a sealing element which is held against axial movement by the contracted portion of the flange. The just described procedure shares the drawbacks of previously outlined technique, i.e., the internal groove of the undercut portion must be formed in a separate operation which follows the making of the fitting. Moreover, if a fitting, whose flange has been formed with an undercut in accordance with the last mentioned prior procedure, is used in pipe lines for hot fluids, the connection between the flange and a flexible or rigid conduit rapidly develops a leak. This is attributable to a peculiarity of thermoplastic synthetic plastic materials which is known as thermal restoration. Briefly stated, the molecules of thermoplastic material assume a predetermined orientation during introduction of plasticized material into a mold. Thus, the orientation of molecules in a flange which, at the time of introduction of plasticized material into the molding cavity, resembles a hollow conical frustum is different from the orientation of molecules in a cylindrical flange. When the flange is heated subsequent to formation of an undercut therein (by causing the free end of the flange to shrink), the molecules tend to assume the original orientation which is characteristic of a hollow frustoconical flange with the result that the flange opens up and permits communication between the confined fluid and the surrounding atmosphere.

OBJECTS AND SUMMARY OF THE INVENTION

An object of the invention is to provide a novel and improved apparatus for producing fittings or other hollow articles which consist of synthetic plastic material and include undercut tubular portions flanked by smaller-diameter tubular portions.

Another object of the invention is to provide an apparatus which renders it possible to form undercut portions simultaneously with the making of hollow articles, i.e., wherein the undercuts develop at the time the respective articles are formed.

A further object of the invention is to provide an apparatus which can be used for mass-production of undercut hollow articles with a high degree of reproducibility and within short intervals of time.

Still another object of the invention is to provide a novel die or mold which can be used for the production of undercut hollow synthetic plastic articles.

Another object of the invention is to provide an apparatus, especially an injection molding machine, which embodies the improved mold.

An ancillary object of the invention is to provide an improved core or plug which forms part of the above-outlined mold.

A further object of the invention is to provide a novel and improved housing for the core of the above-outlined mold.

The invention resides in the provision of an apparatus for making tubular articles of the type wherein two outer tubular or annular portions having first inner diameters flank an intermediate (undercut) annular or tubular portion having a larger second inner diameter. The apparatus comprises means for introducing (preferably injecting) plasticized synthetic plastic material (preferably a synthetic thermoplastic substance) into a mold with a cavity having a configuration which matches that of an article of the aforementioned type and surrounding a core including a larger portion (e.g., a ring-shaped projection) with an outer diameter corresponding to the second inner diameter and two smaller portions which flank the larger portion and have outer diameters corresponding to the first inner diameters whereby the introduced plasticized material (which fills the cavity) is converted into an article of the aforementioned type, means for exposing the exterior of the article (at least in the region of the intermediate portion and one outer portion of the article), means for maintaining the one outer portion of the exposed article in a state (e.g., within a predetermined temperature range) in which the one outer portion can undergo deformation, and means for moving the article and at least a part of the core relative to each other (i.e., the article can be moved relative to the core and/or vice versa) in a direction to force the larger portion of the core through the one outer portion of the article thereon whereby the one outer portion expands during the passage of the larger portion therethrough and thereupon contracts so that its inner diameter is again less than the inner diameter of the undercut intermediate portion of the article.

The difference between the radii of the outer annular portions and the radius of the intermediate portion of the article preferably at least equals (and may be a multiple of) the wall thickness of the article, i.e., the one outer portion of the article can undergo a radial expansion which is several times the wall thickness of the article.

The apparatus preferably further comprises means for causing the material of the engine article to set or harden subsequent to the aforementioned moving step, and means for completely withdrawing the core from the article upon completion of the setting or hardening step.

The one outer portion of the article can be supported from within in the course of the hardening step to prevent excessive reduction of its inner diameter due to shrinkage; this can be achieved by maintaining a portion of the core in the interior of the one outer portion subsequent to forcible movement of the larger portion of the core through the one outer portion of the article.

If the material of the article is a synthetic thermoplastic substance, the temperature of the one outer portion of the article preferably exceeds the temperature of the other outer portion of the article in the course of the moving step. A layer of gaseous fluid (e.g., compressed air) can be established and maintained between the exterior of the core and the interior of the article in the course of the moving step; this facilitates the movement of the article relative to the core and/or vice versa. Such layer can be established by providing the periphery of the core with ports which discharge compressed air in the course of relative movement between the core and the article. The temperature of compressed air can be selected and regulated with a view to insure that the one outer portion of the article remains elastically deformable during forcible passage of the larger core portion therethrough. Since the intermediate portion of the article is likely to undergo at least some expansion during passage of the larger core portion through the one outer portion, the intermediate portion is preferably treated in the same way as the one outer portion, i.e., it is elastically deformable so that it can contract upon withdrawal of the larger portion from its internal groove or recess.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
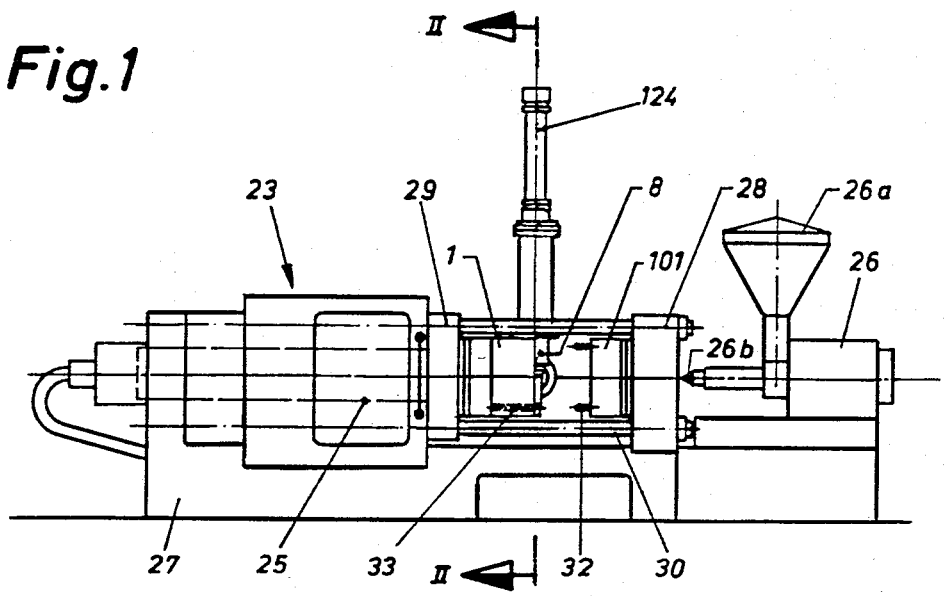
FIG. 1 is a schematic elevational view of an injection molding machine having a mold which embodies one form of the invention, two plate-like sections of the housing of the mold being shown in open positions.
Figure 2:
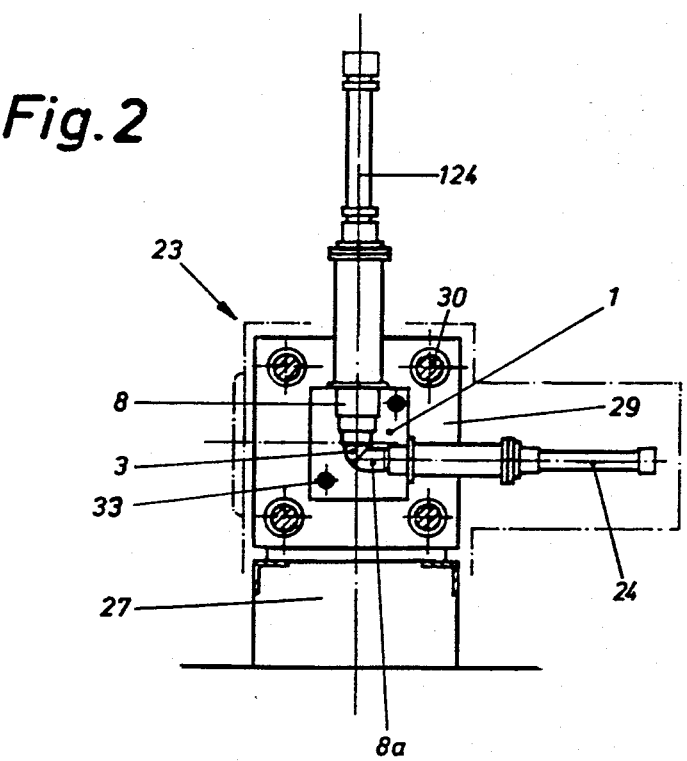
FIG. 2 is an enlarged transverse vertical sectional view, substantially as seen in the direction of arrows from the line II—II of FIG. 1.
Figure 3:
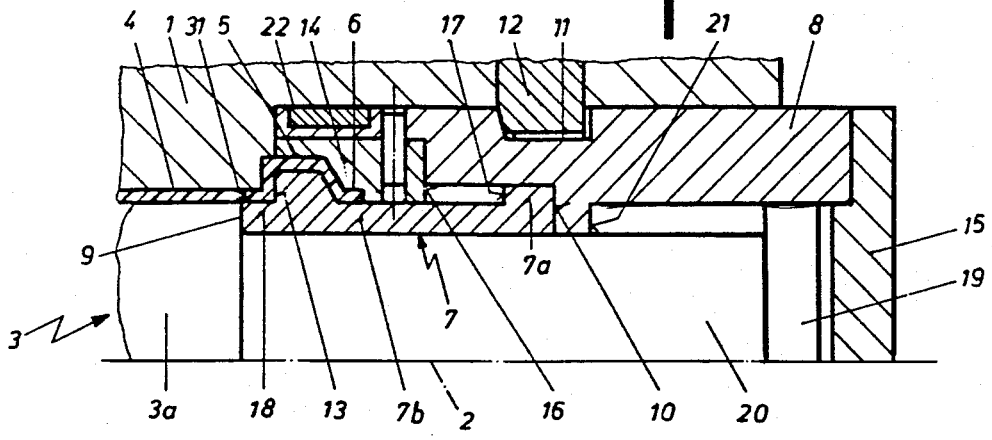
FIG. 3 is a fragmentary central sectional view of the mold in the machine of FIG. 1, with the mold in closed position.
Figure 4:
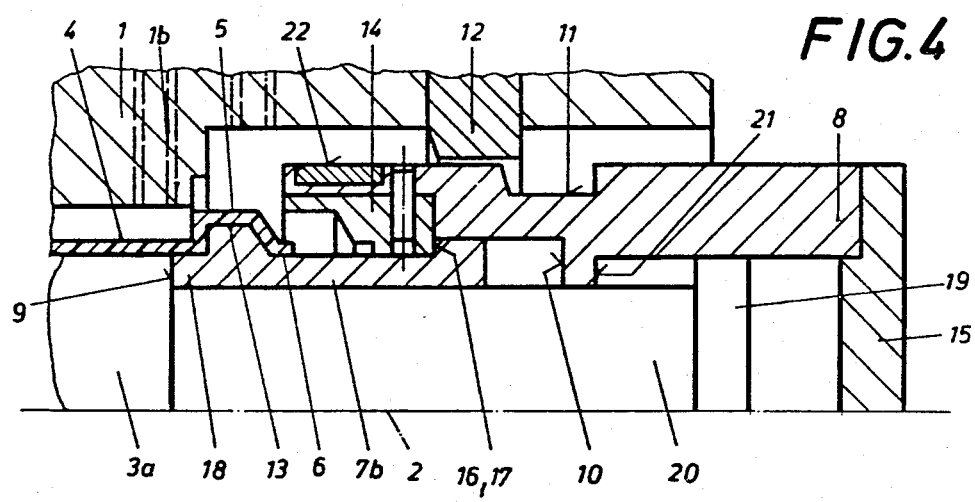
FIG. 4 illustrates the structure of FIG. 3, but with the plate-like sections of the housing of the mold in partly open position and with a sleeve of the housing in partly retracted position.

Referring first to FIGS. 1 and 2, the injection molding machine 23 comprises a base 27 supporting a mold opening, closing and locking unit 25, a plasticizing cylinder 26 with a hopper 26a and injection nozzle 26b, horizontal tie rods 35 for the platen 28 of an interchangeable mold section 101, another interchangeable mold section 1 which is movable between the positions shown in FIGS. 3 and 4 and is mounted on a platen 29, and a hydraulically operated actuating unit 124 for a reciprocable third section or sleeve 8 of the mold. The mold section 101 carries centering pins 32 which enter complementary sockets 33 of the mold section 1 when the mold is closed. The sections 1, 101 and 8 can be said to constitute a housing or shell of the mold, and the latter further comprises a composite first core including a cylindrical main component 3 and a sleeve-like tubular component 7 (FIGS. 3 to 5) which is slidable, within limits, relative to the main component 3. A second core 8a is movable by a second hydraulically operated actuating unit 24.

In order to close the mold, the unit 25 moves the section 1 from the position shown in FIG. 4 to that shown in FIG. 3 (while the unit 124 maintains the sleeve 8 in the end position shown in FIG. 3), and the unit 25 also moves the section 1 toward the section 101 so that the centering pins 32 enter the sockets 33 of the section 1. The unit 25 comprises means for locking the sections 1, 101 against movement away from each other. The machine 23 is then ready for injection of plasticized synthetic plastic material into a mold cavity 31 which is defined by the parts 1, 101, 8, 3, 7 and 8a and whose configuration matches that of an article which is to be produced. The article is assumed to be a fitting or connector having a first part including an undercut (larger-diameter) intermediate portion 5, a first outer portion 6 which is located at one side of the intermediate portion 5 and whose inner diameter is less than the inner diameter of the portion 5, and a second outer portion 4 which is located at the other side of the intermediate portion 5 and whose inner diameter is also less than the inner diameter of the portion 5 (the inner diameter of the outer portion 4 may equal that of the outer portion 6). When the mold is closed (FIG. 3), the nozzle 26b of the cylinder 26 injects plasticized material into the cavity 31 whereby such material fills the cavity and is converted into a hollow article including the portions 4, 5 and 6. The illustrated article includes a second part which is integral with the portion 4, remote from the outer portion 6 and makes an acute, right or obtuse angle with the common axis 2 of the portions 4, 5, 6 and first core 3, 7. The second part of the article surrounds the core 8a. If the second part of the article is to be provided with an undercut, the second core 8a is replaced with a core which is analogous to or identical with the first core. The actuating unit 24 then moves the components of the second core in the same or similar way as will be described in connection with the actuating unit 124 and the first core.

Figure 5:
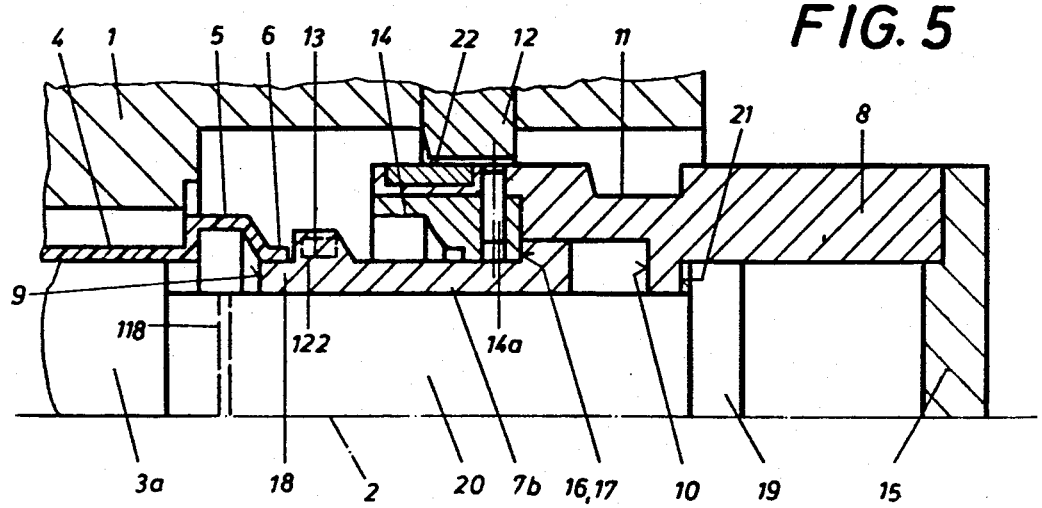
FIG. 5 illustrates the structure of FIG. 4, but wish the sleeve of the housing of the mold in fully retracted position.

The manner in which an article including the portions 4, 5 and 6 is formed in the mold cavity 31, and the manner in which the article is thereupon treated and separated from the first core including the components 3 and 7, is shown in FIGS. 3, 4 and 5. As stated above, FIG. 3 shows the mold in closed position in which the smaller left-hand end portion 18 of the tubular component 7 of the composite first core abuts against an external shoulder 9 of the cylindrical main component 3. A further smaller portion of collar 7a at the right-hand end of the tubular component 7 is engaged by an internal shoulder 10 of the sleeve 8 with a force which suffices to insure that the end portion 18 remains in abutment with the shoulder 9. The outer diameter of the end portion 18 equals the outer diameter of an enlarged portion 3a of the main component 3 (as shown in the drawing, when compared with a portion 13 still to be described the portion 3a can be said to constitute one of the smaller portions of the core) and the portions 3a, 18 determine the inner diameter of the outer portion 4 of the article which is formed in the mold cavity 31. The inner diameter of the undercut intermediate portion 5 of the article is determined by the outer diameter of a ring-shaped larger portion or external projection 13 of the tubular component 7, and the inner diameter of the outer portion 6 is determined by an intermediate portion 7b of the component 7. It will be noted that the radius of the projection 13 exceeds the radius of the portion 7b or 18 to an extent which is greater than the wall thickness of the article in the mold cavity 31; in fact, the difference between the radius of projection 13 and the radii of portions 7b, 18 may be several times the wall thickness of an article.

The mold section 101 has been omitted in FIGS. 3 to 5 for the sake of clarity. The mold section 1 has a substantially semicircular wedge-like locking member 12 which extends into a circumferential groove 11 of the sleeve 8 to maintain the sleeve in the position of FIG. 3. The locking member 12 is optional; it can be omitted if the motion transmitting member 15 of the actuating unit 124 is capable of holding the sleeve 8 in the end position of FIG. 3 without any axial movement in a direction away from the enlarged portion 3a of the component 3. The right-hand end portion 19 of the main component 3 constitutes a collar which serves to guide the sleeve 8 during axial movement with respect to the first core and mold section 1, 101. The sleeve 8 includes a removable portion or insert 14 which is secured thereto by one or more radially extending pins 14a and whose internal surface determines the outer diameters of the portions 5, 6 of an article in the mold cavity 31. The outer diameter of the portion 4 is determined by the adjacent internal surfaces of the mold sections 1 and 101. The right-hand end face 16 of the insert 14 can be moved against an external shoulder 17 of the tubular component 7 to move the latter in a direction away from the shoulder 9 (compare FIGS. 4 and 5). The main component 3 of the first core of the improved mold can be moved axially in a direction to the right, as viewed in FIGS. 3, 4 and 5, when its collar 19 is engaged by an internal shoulder 21 of the sleeve 8 and the sleeve continues to move in a direction to the right (upwardly, as viewed in FIG. 1 or 2).

The insert 14 contains a heating device 22, preferably an electric resistance heater, which surrounds the portions 5 and 6 of the article in the mold cavity 31 and serves to insure that these portions (or at least the portion 6) will remain sufficiently elastic to allow for extraction of the projection 13 from the interior of the article, i.e, to allow the projection 13 to forcibly expand the outer portion 6 during movement of such projection from the position of FIG. 4 to the position of FIG. 5.

The reference character 20 denotes a cylindrical median portion or component of the component 3 which is surrounded by the tubular component 7 and extends from the enlarged portion 3a to the collar 19. The plane in which the mold sections 1 and 101 abut against each other when the mold is closed preferably includes the axis 2.

The portions 4, 5 and 6 may constitute only a small part of an article (e.g., a fitting) which is obtained in response to injection and subsequent hardening of plasticized synthetic plastic material in the mold cavity 31. The major part of such article can be formed on the second core 8a in that portion of the cavity 31 which is located to the left of FIGS. 3 to 5. The exact configuration of such major part of the article is immaterial for the purposes of the present invention; all that counts is to design and operate the improved mold in such a way that the article can be provided with an undercut portion 5 which is flanked by two outer portions having smaller inside or inner diameters than the inside or inner diameter of the undercut portion 5 and that the provision of such undercut intermediate portion takes place at the time the article is formed, i.e., as a direct result of injection of plasticized material into the closed mold without resorting to a core having a radially movable projection which is retracted after the material of the article sets in order to allow for movement of the finished article axially of the first core and/or vice versa. As a rule, the undercut portion 5 will serve to receive an annular sealing element (not shown), such as a packing or a gasket, depending upon whether or not the part which is surrounded by the portions 4, 5 and 6 moves relative to the article.

If the external surface of the undercut intermediate portion 5 of the article is not cylindrical, e.g., if such surface slopes toward the axis 2 in a direction to the right, as viewed in FIG. 3, the insert 14 of the sleeve 8 surrounds that portion of such external surface which is located to the right of the maximum-diameter portion. This is desirable because the insert 14 should be movable between the positions shown in FIGS. 3 and 4.

The sleeve 8 can contain or carry one or more temperature measuring devices (not shown) which monitor the temperature of the insert 14 and regulate the heating action of the device 22 so that the temperature of the insert 14 and of portions 5 and 6 of the article in the mold cavity 31 invariably remains within an optimum range which is best suited to insure that at least the outer portion 6 (but preferably the portions 5 and 6) will remain sufficiently elastic to allow for temporary radial expansion during extraction of the projection 13 as well as that such expansion is followed by contraction of the portion 5 and/or 6 so that the inner diameter of the portion 5 will again exceed the inner diameters of portions 4 and 6. If desired, the heating device 22 can be replaced with a heating device 122 (shown in FIG. 5 by broken lines) which is installed in the projection 13. Alternatively, the improved mold may comprise two heating devices, one in the insert 14 (which latter can be said to form part of the sleeve 8) and one in the projection 13.

The aforementioned temperature measuring or monitoring means can be used to regulate the heating action of the device 22, of the device 122 or of the devices 22, 122 in a fully automatic way, or it may include a pointer whose position is read by an attendant so that the attendant can manually adjust the heating action when the monitored temperature deviates from an optimum temperature or temperature range. Monitoring devices which can be used in or in combination with the mold of the present invention are known in the art.

The operation:

When the mold is to be closed, the unit 25 moves the mold section 1 and the actuating units 24, 124 toward the platen 28, and the nozzle 26b injects plasticized synthetic plastic material (e.g., a thermoplastic substance) into the cavity 31. When the material in the cavity 31 becomes self-supporting, the mold section 1 is moved away from the mold section 101 (the mold section 1 then assumes the position shown in FIGS. 4 and 5) whereby the mold section 1 withdraws the locking member 12 from the groove 11 and thus enables the motion transmitting member 15 of the actuating unit 124 to move the sleeve 8 from the position of FIG. 3 to the position of FIG. 4. The rightward movement of the sleeve 8 is terminated when the end face 16 of the insert 14 moves into abutment with the external shoulder 17 of the tubular component 7. The external surfaces of the portions 4, 5 and 6 of the article in the mold cavity 31 are then exposed because the insert 14 has been moved axially of the main component 3 and away from the shoulder 9 and the mold section 1 has been moved radially of and away from the axis 2 and also away from the mold section 101.

The cooling of the portion 4 of the article in the mold cavity 31 is more pronounced than that of the portions 5 and 6 (this is due to the provision of heating device 22, heating device 122 or heating devices 22 and 122). The arrangement may be such that the heating device or devices are connected with an energy source subsequent to injection of plasticized material or prior to or during such injection, i.e., the heating means can prevent excessive cooling of injected material or the heating means reheats the material of the portions 5 and 6 subsequent to completion of the injecting step. All that counts is to insure that the material of the portions 5 and 6 remains in or is brought into a state in which the portions 5 and 6 can undergo elastic expansion to permit for extraction of the projection 13 from the article (in a direction toward and through the outer portion 6). If the injected plasticized material is polyvinyl chloride, the heating element 22 can be set to maintain the insert 14 at a temperature of 70°–130° C. in the course of the injecting step. Such heating of the insert 14 does not prevent any and all cooling of the portions 5 and 6 (and it also fails to prevent a reorientation of molecules of injected material in accordance with the nature of the mold cavity); however, it has been found that the aforementioned temperature range is normally sufficient to insure that the material of the article does not harden to such an extent (or sets) that the portions 5 and 6 would be incapable of undergoing temporary elastic expansion during withdrawal of the projection 13.

In order to withdraw the projection 13 from the undercut intermediate portion 5 of the article, the motion transmitting member 15 of the actuating unit 124 moves the sleeve 8 beyond the position of FIG. 4 whereby the end face 16 of the insert 14 (which is rigid with the sleeve 8) entrains the tubular component 7 of the first core in a direction to the right so that the projection 13 expands the tapering part of the intermediate portion 5 as well as the outer portion 6. The elasticity of the portions 5 and 6 is sufficient to insure that these portions contract upon extraction of the projection 13 whereby the internal surface of the outer portion 6 preferably comes into abutment with the external surface of the end portion 18 of the tubular component 7 to prevent excessive contraction of such outer portion. The tubular component 7 thereupon remains in the position of FIG. 5 until the material of the article sets sufficiently to warrant complete separation of the article from the first core, e.g., by moving the internal shoulder 21 of the sleeve 8 into abutment with the collar 19 and by causing the actuating unit 124 to move the sleeve 8 beyond the position shown in FIG. 5. The actuating unit 24 withdraws the second core 8a prior to, simultaneously with or subsequent to separation of portions 4, 5 and 6 from the first core. The machine 23 is then ready to start the next cycle which begins as soon as the mold closes. Such closing includes a movement of components 3 and 7 of the first core back to the positions shown in FIG. 3 (whereby the internal shoulder 10 of the sleeve 8 urges the end portion 18 of the tubular component 7 against the shoulder 9 of the main component 3) and subsequent movement of the mold section 1 toward the mold section 101 so that the locking member 12 can enter the groove 11 of the sleeve 8 and the unit 25 can clamp the sections 1 and 101 to each other. Also, the actuating unit 24 returns the second core 8a to the position shown in FIG. 2.

In order to reduce the length of intervals which are needed for the completion of a cycle, the injection molding machine 23 may comprise means for promoting the setting of plastic material of an article, especially subsequent to withdrawal of the projection 13. This can be achieved by providing the mold sections 1 and 101 with ports (see the ports 1b in the mold section 1 of FIG. 4) which direct compressed air or another fluid coolant against the external surface of the article on the main component 3 of the first core.

It is further possible to facilitate the withdrawal of projection 13 from the interior of the article by establishing a layer or film of a preferably gaseous fluid between the core and the internal surfaces of the portions 4, 5 and 6 (or at least between the first core and the portions 5 and 6). This can be achieved by providing the portion 20 of the main component 3 and/or the end portion 18 and projection 13 of the tubular component 7 of the first core with ports which discharge fluid against the internal surface of the article. One such port is shown in FIG. 5, as at 118.

My invention is based on the recognition that the majority of synthetic plastic materials which are presently used for the making of pipe fittings or the like (especially synthetic thermoplastic materials) exhibit a pronounced elasticity immediately upon completion of the injecting step in an injection molding or an analogous machine, that such elasticity can be enhanced and/or maintained by appropriate treatment (especially heating) to insure that the annular portions 5 and 6 of an article in the mold cavity 31 can expand during forcible extraction of the larger portion or projection 13 of the tubular component 7, and that such annular portions thereupon contract automatically to reassume or to at least closely approach their desired shape (especially the inner diameters as determined by the outer diameters of projection 13 and smaller portion 7b of the tubular component 7). All that is necessary is to maintain at least the outer portion 6 (but preferably also the undercut intermediate portion 5) within a temperature range which depends on the nature and/or composition of the selected synthetic plastic material and which, in the case of polyvinyl chloride, is normally that temperature which is achieved by heating the insert 14 of the sleeve 8 to a temperature of 70°–130° C. preferably 80°–90° C. The conditioning of articles in the mold cavity 31 prior to and during extraction of the projection 13 can be enhanced by localized cooling of articles in addition to aforementioned heating by the device 22 and/or 122, e.g., by cooling with air streams which issue from the ports 1b and/or 118. The feature that the undercut intermediate portion 5 of an article in the mold cavity is finished simultaneously with the making of the article (i.e., without necessitating resort to a secondary treatment, such as removal of material by one or more tools and/or a blowing operation) contributes to a much higher output of the machine and reduces the initial cost of the articles. Moreover, the dimensions of each and every article of a long series of articles are invariably identical since the circumstances under which the undercut intermediate portions 5 of successive articles are formed remain unchanged during each cycle of the injection molding machine.

In accordance with presently known molding techniques, molded articles are expelled from the cavity or separated from the core after the material of the articles has been allowed to set. This is considered necessary in view of the generally accepted belief that a pronounced deformation of an article whose material is still hot will result in permanent deformation. Therefore, certain presently known injection molding machines for the production of hollow articles having undercut tubular portions employ a cylindrical core of constant diameter and a collapsible ring which surrounds the core and is received in the undercut portion of the article. When the material of the article has been allowed to set, the core is withdrawn from the article and from the collapsible ring, and the ring is thereupon collapsed so that it can be readily withdrawn from the undercut portion. The mold of the just described conventional machine does not have an outer housing so that the wall thickness is likely to vary (and normally varies) from article to article. Also, the removal of collapsible ring is a time-consuming operation which contributes to the cost of articles.

The apparatus of the present invention takes advantage of the aforediscussed peculiarity (thermal restoration) of synthetic plastic materials, i.e., the portions (5 and 6) which are expanded radially outwardly in response to movement of the projection 13 from the position of FIG. 4 to the position of FIG. 5 exhibit a pronounced tendency to reassume the shape shown in FIGS. 3 and 4 with the result that the portions 5 and 6 contract as soon as the projection 13 has been withdrawn. As stated above, the temperature of portions 5 and 6 during extraction of the projection 13 from the article should be selected with a view to avoid any interference with such orientation of molecules which takes place when the plasticized material is injected into the mold cavity 31. This insures that the portions 5 and 6 contract as soon as the extraction of the projection 13 is completed. In other words, whereas the so-called thermal restoration is undesirable in accordance with certain presently known techniques of making tubular articles with undercut portions, such characteristic of plastic material is used in accordance with the present invention to insure the making of undercut tubular articles by resorting to relatively simple and inexpensive molds which need not employ collapsible rings or other complex devices for the making of undercuts.

Other presently preferred materials which can be utilized for the making of undercut hollow articles in the improved machine include high- and low-density polyethylene, polypropylene, polystyrene and acrylonitrile-butadiene-styrene copolymers. The presently preferred temperature range during temporary expansion of articles which consist of the above-enumerated materials is between 70° and 130° C.

Figure 6:
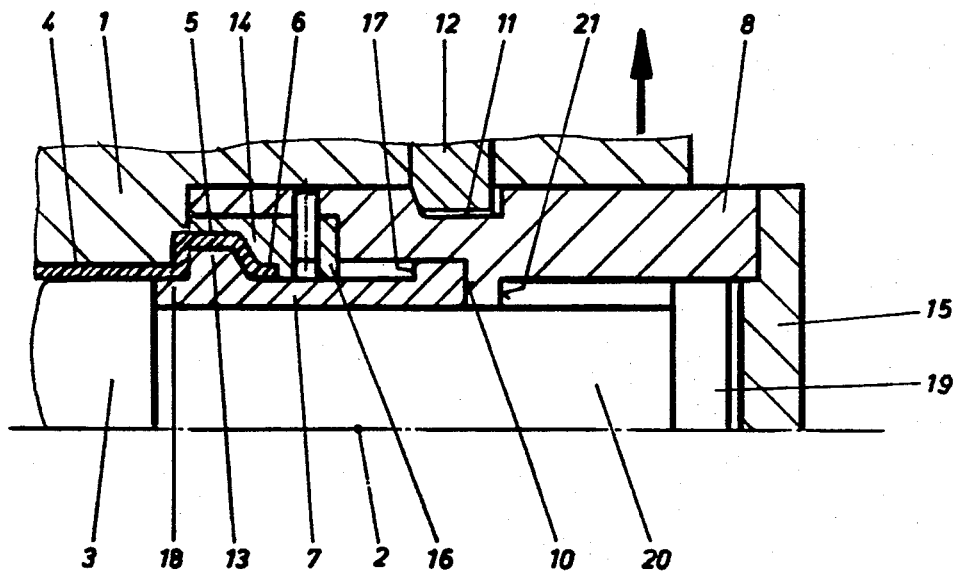
FIG. 6 is a fragmentary central sectional view of a modified mold.

FIG. 6 shows a portion of a mold wherein all such parts which are identical with or clearly analogous to corresponding parts of the mold of FIGS. 3 to 5 are denoted by similar reference characters. The main difference between the two molds is that the mold of FIG. 6 does not have a heating means in or on the insert 14 of the sleeve 8. The mold of FIG. 6 is shown in closed position corresponding to that of FIG. 3. The nature of material which forms the article in the mold cavity is assumed to be such that the elasticity of portions 5 and 6 suffices (without resorting to a heating device in or on the insert 14) to insure that the projection 13 can be withdrawn from the article and that these portions contract as soon as the projection 13 reaches a position corresponding to that shown in FIG. 5.

The improved mold is susceptible of many additional modifications. For example, the housing of the mold may consist of more than three sections and the tubular component 7 of the first core may also consist of two or more sections which are movable relative to each other in a given sequence so as to withdraw the projection 13 from the undercut intermediate portion 5 before the material of the article sets but subsequent to exposure of the undercut portion 5 and outer portion 6. It is further possible to employ a one-piece first core wherein the components 3 and 7 constitute an integral unit. Furthermore, the configuration of the outer surfaces of all three annular portions 4, 5 and 6 of an article in the mold cavity 31 can be determined by the mold sections 1 and 101 alone. In such molds, the motion transmitting means of the actuating unit 124 (or an anlogous actuating unit) can be coupled directly to the tubular component 7 of the first core.

If the inner diameter of the intermediate portion 5 does not greatly exceed the inner diameter of the outer portion 6, the insert 14 can be moved from the position of FIG. 3 to the positions of FIGS. 4 and 5 simultaneously with the tubular component 7 or simultaneously with a one-piece first core wherein the portion corresponding to the component 7 is an integral part of the portion corresponding to the main component 3. This (especially when utilizing a one-piece first core) contributes to pronounced simplifiaction and greatly reduced cost of the apparatus.

It will be readily appreciated that fittings (e.g., elbows) and/or the like constitute but a few examples of articles which can be produced by resorting to the apparatus of the present invention. The improved apparatus can be resorted to for the production of a large variety of articles, especially articles wherein the inner diameter of the undercut portion greatly exceeds the inner diameters of the adjoining outer portions, including articles of circular, oval or polygonal cross-sectional outline as well as articles which are closed at one end, e.g., plastic containers which are provided with undercut portions constituting aerating channels or the like. If the undercut portion of a container is immediately adjacent to one end wall (e.g., the bottom wall), such end wall constitutes an equivalent of the portion 4 of the article shown in FIG. 3, and the inner diameter of such end wall is zero.

It is further clear that the apparatus can be used for the production of fittings or other types of hollow articles each of which has two or more undercut portions.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. In an apparatus for the production of tubular articles of the type wherein two outer annular portions having first inner diameters flank an undercut intermediate annular portion having a larger second inner diameter, particularly in an injection molding machine for thermoplastic synthetic plastic materials, the combination of a mold having an open-and-shut multipartite housing; a core separate from and spacedly surrounded by said housing and defining therewith an annular cavity having a configuration matching the configuration of said articles, said core including an external ring-shaped projection with an outer diameter corresponding to said second inner diameter and two smaller portions flanking said projection and having outer diameters corresponding to said first inner diameters, said core being composed of a tubular first component and a second component, said second component being axially slidably surrounded by said first component; means for opening and closing said housing; means for introducing into said cavity a charge of plasticized synthetic plastic material which fills said cavity and is thus converted into an article of said type while said housing is closed, said housing determining solely the external configuration and said core determining solely the internal configuration of the article in said cavity; means for maintaining at least one outer portion of the article on said core in a state in which said one outer portion can undergo elastic deformation in open position of said housing; and means for moving said core and the article thereon relative to each other axially of said core and in a direction to force said projection through said one outer portion while said housing is open whereby said one outer portion expands and thereupon contracts so that its inner diameter is again less than said second inner diameter.

2. The combination of claim 1, wherein said housing has means for discharging a fluid coolant against the exterior of the article on said core.

3. The combination of claim 1, wherein said housing includes three sections including first and second sections movable toward and away from each other radially of said core and a third section movable in the axial direction of said core.

4. The combination of claim 1, wherein said maintaining means comprises a heating device in said core.

5. The combination of claim 1, wherein one of said smaller portions is received in said one outer portion of the article upon completion of movement of said projection of said core through said one outer portion of the article.

6. The combination of claim 1, wherein said maintaining means comprises a heating device in said housing.

7. The combination of claim 6, wherein said core has at least one port for introduction of a layer of fluid between said core and the article thereon.

8. The combination of claim 7, wherein said fluid is a compressed gas.

9. The combination of claim 1, wherein said housing comprises a section which spacedly surrounds said projection and said one smaller portion of said core in the closed position of said housing, said section being movable axially of said core between first and second positions in which the intermediate portion and said one outer portion of the article on said core are respectively concealed and exposed.

10. The combination of claim 9, wherein said section of said housing is a sleeve which is coaxial with said core.

11. The combination of claim 10, said means for opening and closing said housing comprising actuating means for moving said sleeve between said first and second positions and beyond said second position, said means for moving said core and the article thereon relative to each other being provided on said sleeve and being arranged to move said projection through said one outer portion of the article on said core in response to movement of said sleeve beyond said second position.

* * * * *